Dec. 1, 1931.

L. C. WOLFE

CARBURETOR

Re. 18,269

Original Filed Jan. 13, 1926 2 Sheets-Sheet 1

Inventor

Louis C. Wolfe,

By N. E. Gee

Attorney

L. C. WOLFE

CARBURETOR

Dec. 1, 1931.

Re. 18,269

Original Filed Jan. 13, 1926 2 Sheets-Sheet 2

Inventor

Louis C. Wolfe,

By N. E. Lee

Attorney

Reissued Dec. 1, 1931

Re. 18,269

UNITED STATES PATENT OFFICE

LOUIS C. WOLFE, OF ALTOONA, PENNSYLVANIA, ASSIGNOR TO AMERICAN CARBURETOR IMPROVEMENT COMPANY, A CORPORATION OF DELAWARE

CARBURETOR

Original No. 1,753,634, dated April 8, 1930, Serial No. 81,069, filed January 13, 1926. Application for reissue filed May 20, 1931. Serial No. 539,122.

This invention relates to internal combustion engines, wherein gasoline, one of the lighter distillates of crude oil is admitted to the cylinder in a finely divided state through the medium of a carburetor, the duty of which is to vaporize the gasoline and to mix it in the correct proportions with oxygen in the air in the ratio of about six parts by weight or vapor to 100 parts of air, which mixture gives the most perfect combination. This mixture when exploded through the medium of an electric spark makes a most perfect combustion mixture, and the primary object of this invention is to provide an improved carburetor wherein the proper mixture is had at all times regardless of the engine piston speed.

A further object of this invention is to provide improved means for admitting the proper mixture to high speed six and eight cylinder engines through the medium of a third gasoline jet that functions only at the required speed of the piston while air in the correct proportion is mixed with the gasoline as it emerges from the jet.

A still further object of this invention is to provide means for housing the jet of the third gasoline supply pipe together with means for lifting the housing so as to uncover the nozzle while at the same time providing means for spraying the gasoline such as to greatly facilitate its proper mixture with the air drawn in through the air intake.

With these and many other objects in view which will be more readily apparent as the nature of the invention is better understood, the same consists in the novel construction, combination and arrangement of parts, as will be hereinafter fully pointed out illustrated and claimed.

It will be quite readily understood by those skilled in the art to which this invention belongs, that the same is susceptible to various changes and modifications without departing from the spirit or scope of the invention, but a preferred and practical embodiment of the invention is shown in the accompanying drawings in which—

Similar reference numerals refer to similar parts throughout the several figures of the drawings.

Figure 1:
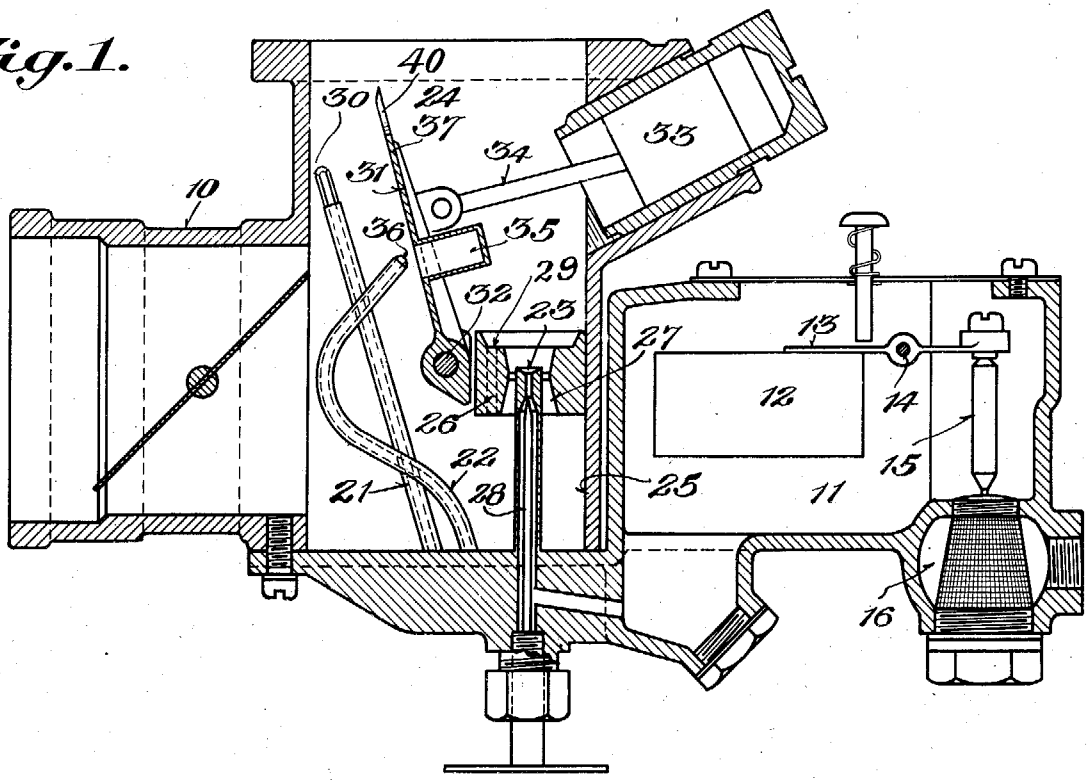
Figure 1 is a cross sectional view of my improved carburetor, showing the nozzle assembly as well as the hood arrangement employed to house the nozzle of the third nozzle.

In the construction of this improved carburetor, designated in its entirety by the numeral 10, I use the usual gasoline float chamber 11, having positioned therein a float 12 attached to a plate 13, which is loosely pinioned on a fulcrum 14, and adapted to carry at the opposite end the usual needle valve 15, which controls the gasoline inlet from the supply sump to the float chamber 11. The float chamber is also provided with a gasoline sump 17, gasoline to this sump being controlled by a needle valve 18, adapted to be actuated through a link 19, one end of which has a pin connection with a bell crank 20, shown positioned on the intake manifold above the carburetor. This bell crank 20 is actuated through the medium of a link 20*a*, which is suitably attached to the gasoline control mechanism at the operator's foot or hand throttle on the steering gear. The mechanism shown gives a rapid opening of the needle valve which permits the passage of gasoline to the medium and high speed nozzles designated by the numerals 21 and 22 respectively. The gasoline supply to the chamber is controlled through the float 12, which prohibits the gasoline from rising above the orifice of nozzle 23 as shown in Figure 1 of the drawings.

Figure 2:
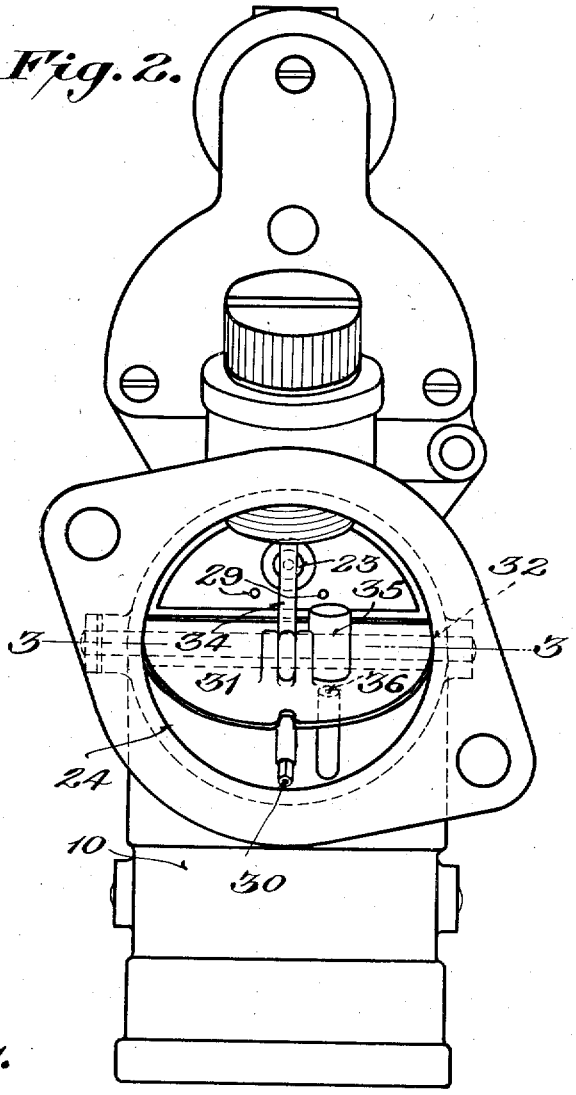
Figure 2 is a plan view of the carburetor shown in Figure 1 of the drawings.
Figure 3:
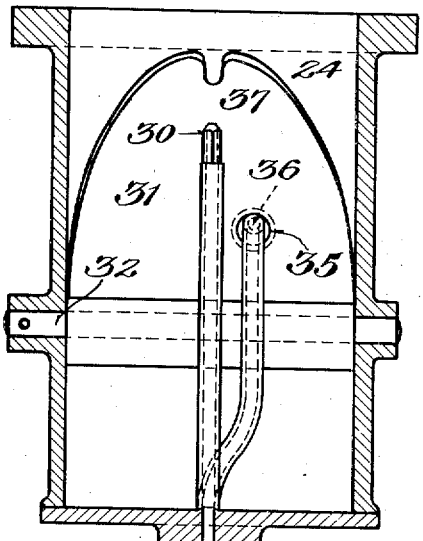
Figure 3 shows a sectional view taken on the line 3—3 of Figure 2.

The low speed nozzle 23, is adapted to be positioned in the air intake passage 24, adjacent the wall 25, where it is shown housed in a segmental block 26. The block 26 is provided with a Venturi passage 27 through which air is drawn to combine with the gasoline drawn from the nozzle 23, the supply to which is controlled through a needle valve 28 as shown in Figure 1 of the drawings. To provide a more perfect mixture of gasoline and air for low piston speeds, a plurality of openings 29 are provided in the block 26 as shown in Figure 2 of the drawings.

Figure 4:
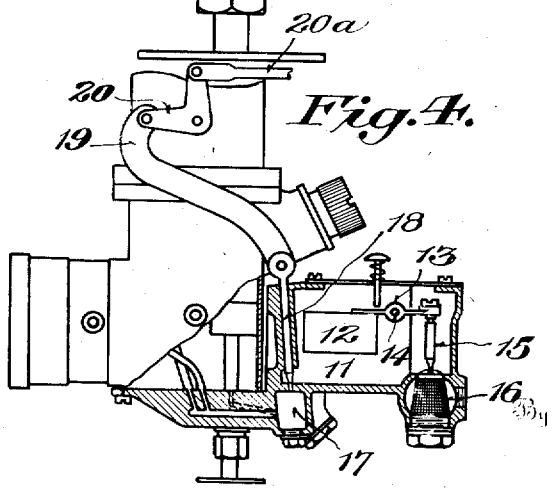
Figure 4 is a side elevational view of my improved carburetor, showing the means employed for opening the needle valve which controls the gasoline outlet from the float chamber to medium and high speed nozzles, positioned in the air passage of the carburetor.

By reference to Figure 4 of the drawings it will be seen that the gasoline supply to the medium speed nozzle 21 and the high speed nozzle 22 is controlled through a needle valve 18 which permits the passage of gasoline from the float chamber 11 to the sump 17, and the valve is adapted to open rapidly after the piston speed has reached the maximum for low speed work, at which time fuel is drawn through the nozzle 21, striking the wall 30, against which it is sprayed to mingle with the air passing up through the air chamber 24. A flap valve 31 is positioned in the air passage, where it is provided with a fulcrum 32 on which it is adapted to swing. The valve 31 is further provided with an adjustable dash pot 33 to which it is attached through the medium of a link 34. In the back of the valve 31 I position a cylindrical housing 35 which is adapted to cover over and completely house the end 36 of the nozzle 22. This housing 35 is designed to remain over the nozzle end 36 until the engine speed is such that the required air volume is sufficient to lift the flap valve 31 and thus uncover the nozzle, which at this time discharges a fine stream of gasoline against the face 37 of the flap valve 31, thus in a very effective way, the gasoline is sprayed permitting the air in the correct proportions to mingle therewith giving, when most needed, an explosive mixture for high piston speeds in six and eight cylinder automobiles. As the piston speeds decline, the flap valve 31 automatically falls and the housing 35 again closes the nozzle 36, and since the elevation of the nozzle is higher than the supply in float chamber the gasoline supply through the nozzle is automatically shut off.

Relative to the foregoing, it will be noted that the flap valve 31 is provided with a relatively small notch 40 which is located a sufficient distance above the nozzle 21 when the free edge portion of the valve falls against the wall 30 of the housing to thereby prevent substantially any suction occurring in the immediate vicinity of the outlet end of said nozzle during low speeds. Without suction, fuel will not be drawn from the nozzle 21 and consequently at low speeds only the nozzle 23 is effective to admit fuel into the passage 24. At medium speeds, which result in increased suction through the passage 24, with consequent elevation of the free edge portion of the flap valve 31, the outlet end of the nozzle 21 is exposed to suction and fuel is drawn from said nozzle into the passage 24. The nozzle 21 thus is a medium speed nozzle, not only for the reasons just stated but because its outlet end is disposed considerably above the outlet end of the nozzle 23, greater suction being required under such conditions to draw fuel from said nozzle 21 than from the nozzle 23 as is manifest.

Having thus described my invention what I claim and desire to be secured by Letters Patent is—

1. A multiple jet carburetor having an air passage therethrough, an insert arranged in said air passage and having an opening, a float chamber, a low speed fuel nozzle projecting into said opening and communicating with said float chamber, a medium speed nozzle terminating substantially above the low speed nozzle and projecting into the air passage, a high speed nozzle terminating below the said medium speed nozzle and projecting into said air passage, a communication between said medium and high speed nozzles and said float chamber, a throttle operated needle valve controlling said communication, a flap valve hinged adjacent said insert, said valve having a free edge portion normally lying against the wall of said air passage nearest said medium speed nozzle, said flap valve also carrying a housing for normally covering said high speed nozzle and being notched to normally slightly uncover the medium speed nozzle, but not sufficiently notched to subject it to operation, and cushioning means for said flap valve.

2. A carburetor including a mixing chamber, an air inlet to said chamber, a low speed gasoline jet exposed to the action of the draft through the chamber, a second jet in said chamber terminating substantially above said first jet, a third jet in said chamber terminating below said second jet, and means for shielding said second and third jets from the action of the draft through the chamber, said means being movable and so disposed with relation to said second and third jets that, upon movement, it successively exposes said second and third jets to the action of the draft.

3. A carburetor including a mixing chamber, an air inlet to said chamber, a low speed gasoline jet exposed to the action of the draft through the chamber, a second jet in said chamber terminating substantially above said first jet, a third jet in said chamber terminating below said second jet, and means for shielding said second and third jets from the action of the draft through the chamber, said means yieldingly urged to the shielding position and subject to the action of the draft to uncover the second and third jets, said means and the said second and third jets being so arranged that the action of the draft on said means successively subjects said second and third jets to the action of the draft as the said draft increases.

4. A multiple jet carburetor having an air passage, a float chamber, a low speed fuel nozzle communicating with said float chamber and exposed to the action of the draft through the air passage, a medium speed nozzle projecting into the said air passage, a high speed fuel nozzle terminating below said medium speed nozzle and projecting into the air passage, a communication between said medium and high speed nozzles and the float chamber, a valve controlling said communication, a throttle valve, a rigid interlock having pivotal joints therein between said first mentioned valve and said throttle valve, a suction controlled flap valve substantially shielding said medium and high speed nozzles from the action of the draft through the air passage, said flap valve being movable and having its free edge portion normally lying against the wall of the said air passage nearest the medium speed nozzle, and said flap valve carrying a housing for normally covering said high speed nozzle.

5. A multiple jet carburetor having an air passage, a float chamber, a low speed fuel nozzle exposed to the action of the draft through the air passage, a communication between said low speed nozzle and said float chamber, a manually operated valve controlling said communication, a medium speed nozzle terminating substantially above the low speed nozzle and projecting into the air passage, a high speed fuel nozzle terminating below said medium speed nozzle and projecting into the air passage, a communication between said medium and high speed nozzles and the float chamber, a valve controlling said last mentioned communication, a throttle valve, a rigid interlock having pivotal joints therein between said valve controlling said last mentioned communication and said throttle valve, and a suction controlled flap valve for substantially shielding said medium and high speed nozzles from the action of the draft through the air passage, said valve being movable and so disposed with relation to the medium and high speed nozzles that upon movement said medium and high speed nozzles are successively brought into operation.

6. A multiple jet carburetor having an air passage, a float chamber, a low speed fuel nozzle exposed to the action of the draft through the air passage, a communication between said low speed nozzle and said float chamber, a medium speed nozzle terminating substantially above the low speed nozzle and projecting into the air passage, a high speed fuel nozzle terminating below said medium speed nozzle and projecting into the air passage, a communication between said medium and high speed nozzles and the float chamber, a valve controlling and adapted to open and close said last mentioned communication, a throttle valve, a rigid interlock having pivotal joints therein between said valve controlling said last mentioned communication and said throttle valve, and a suction controlled flap valve for substantially shielding said medium and high speed nozzles from the action of the draft through the air passage, said valve being movable and so disposed with relation to the medium and high speed nozzles that upon movement said medium and high speed nozzles are successively brought into operation.

In testimony whereof he affixes his signature.

L. C. WOLFE.